United States Patent [19]
Rajamani et al.

[11] Patent Number: 5,857,321
[45] Date of Patent: Jan. 12, 1999

[54] CONTROLLER WITH NEURAL NETWORK FOR ESTIMATING GAS TURBINE INTERNAL CYCLE PARAMETERS

[75] Inventors: Ravi Rajamani, Schenectady; Nicolas Wadih Chbat, Troy; Todd Alan Ashley, Clifton Park, all of N.Y.

[73] Assignee: General Electric Company, Shenectady, N.Y.

[21] Appl. No.: 661,688

[22] Filed: Jun. 11, 1996

[51] Int. Cl.$^6$ .................................................. F02C 9/00
[52] U.S. Cl. .................. 60/39.27; 60/39.24; 364/431.02
[58] Field of Search ............................... 60/39.24, 39.27, 60/39.28, 233, 243; 364/431.02

[56] References Cited

U.S. PATENT DOCUMENTS

| | | | |
|---|---|---|---|
| 5,309,379 | 5/1994 | Rawlings et al. | 364/588 |
| 5,386,689 | 2/1995 | Bozich et al. | 60/39.33 |
| 5,434,951 | 7/1995 | Kuwata et al. | 395/24 |
| 5,479,358 | 12/1995 | Shimoda et al. | 60/204 |

OTHER PUBLICATIONS

Paper presented at the International Gas Turbine & Aeroengine Congress & Exhibition in Birmingham, UK on Jun. 12, 1996 entitled, "Estimating Gas Turbine Internal Cycle Parameters Using a Neural Network," Nicolas W. Chbat et al.

Paper entitled, "Learning Representations by Back–Propagating Errors," David E. Rumelhart et al., Nature vol. 323, Oct. 9, 1986, pp. 533–536.

Paper entitled, "An Integrated Robust/Neural Controller With Gas Turbine Applications,"Q. Song et al., Proc. 1994 IEEE Conf. Control Applications, Glasgow, UK, pp. 411–415.

M. Sakawa et al., "An Application of Neuro–like Fuzzy Method to Gas Turine $No_x$ Concentration Prediction Problem," Proc. 1993 International Joint Conference on Neural Networks, Nagoya, Japan, pp. 2913–2916.

*Primary Examiner*—Louis J. Casaregola
*Attorney, Agent, or Firm*—Donald S. Ingraham; Douglas E. Stoner

[57] ABSTRACT

A gas turbine control system includes a controller that is coupled to actuator systems that govern operation of the gas turbine. The controller includes a processor for generating respective actuator control signals in correspondence with a plurality of turbine operating condition signals; the controller includes at least one neural network estimator that is trained to generate an estimated turbine operating condition signal. The neural network estimator typically has one or more hidden neuron layers that are coupled together in a feedforward structure, a recurrent neural network architecture. The estimated turbine operating condition signal generated by the neural network estimator typically, but not necessarily, represents a turbine internal cycle operating parameter for which the turbine has no corresponding operating parameter sensor.

19 Claims, 3 Drawing Sheets

CONTROLLER WITH NEURAL NETWORK FOR ESTIMATING GAS TURBINE INTERNAL CYCLE PARAMETERS

BACKGROUND OF THE INVENTION

The present invention relates generally to gas turbines, and more particularly to a control system for a gas turbine that includes a neural network for determining certain turbine operating parameters of importance for effective control of the gas turbine.

Gas turbines are commonly used as a power source to drive electrical generating equipment (such as in an electrical power station) or for propulsion (e.g., for aircraft, marine vessels, or military equipment such as tanks). A combustion type gas turbine has a gas path which typically includes, in a serial-flow relationship, an air intake (or inlet), a compressor, a combustor, a turbine, and a gas outlet (or exhaust nozzle). Control of the power generated by the gas turbine is typically exercised through control of fuel flow and air flow into the combustor.

Efficient operation of the gas turbine—e.g., to obtain desired fuel economy, to establish and maintain a desired power output that is stable within defined limits, and to reduce the level of emissions—requires that a number of critical turbine operating parameters be processed to determine optimal settings for controllable parameters, such as fuel flow and distribution, and intake air flow. Examples of such turbine operating parameters include compressor inlet and outlet temperatures and pressures, exhaust temperatures and pressures, and the like.

Certain turbine operating parameters cannot be directly measured reliably; hence estimates of the values of such parameters are made based on the available sensor data. One example of an important operating parameter in a power-generation gas turbine that cannot be directly measured is the combustion reference temperature (TTRF). While not representing a particular physical temperature in the turbine, this parameter is nevertheless an important control variable that governs a number of critical functions. For example, dynamically the TTRF correlates well with the average fuel-air-ratio in the combustor and hence is used to control the division of fuel going to various parts of the combustor. Efficient operation of the turbine requires that accurate information about this parameter be available to the controller at all times.

Calculation of values of TTRF conventionally is achieved by processing selected sensor measurements through a model having simplified aero-thermal equations for the turbine. The model for TTRF is usually represented in the controller as a set of nonlinear equations, with sensed parameters such as the compressor discharge pressure, turbine exhaust temperature, exhaust air flow, ambient temperature, and guide vane angle, serving as inputs. Because the modeled system is nonlinear, even complex models can estimate this parameter only over a limited range of operating points. Even so, estimation of this parameter requires significant computing power given the number of mathematical steps that must be completed to make the estimate; the time taken to accomplish these processing steps further places limitations on conventional controllers.

It is desirable that a gas turbine controller provide effective control over a wide range of turbine operating conditions. To achieve such performance, an effective controller advantageously is adapted to rapidly and accurately generate values for calculated (or modeled) turbine operating parameters over the wide range of turbine performance.

SUMMARY OF THE INVENTION

A gas turbine control system in accordance with this invention includes a controller that is coupled to actuator systems that govern operation of the gas turbine. The controller includes a processor for generating respective actuator control signals in correspondence with a plurality of turbine operating condition signals; the controller includes at least one neural network estimator that is trained to generate an estimated turbine operating condition signal. The controller is further typically coupled to a plurality of sensors to receive therefrom sensed turbine operating parameters, some of which sensed parameters provide input signals to the neural network estimator. The neural network estimator typically has one or more hidden neuron layers that are coupled together in a feedforward architecture, or alternatively in a recurrent neural network architecture. The estimated turbine operating condition signal generated by the neural network estimator typically, but not necessarily, represents a turbine internal cycle operating parameter for which the turbine has no corresponding operating parameter sensor. The neural network estimator is typically further trained to generate the estimated turbine operating condition signal over a selected range of turbine operating conditions, the range corresponding to turbine operations from startup to fully loaded.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
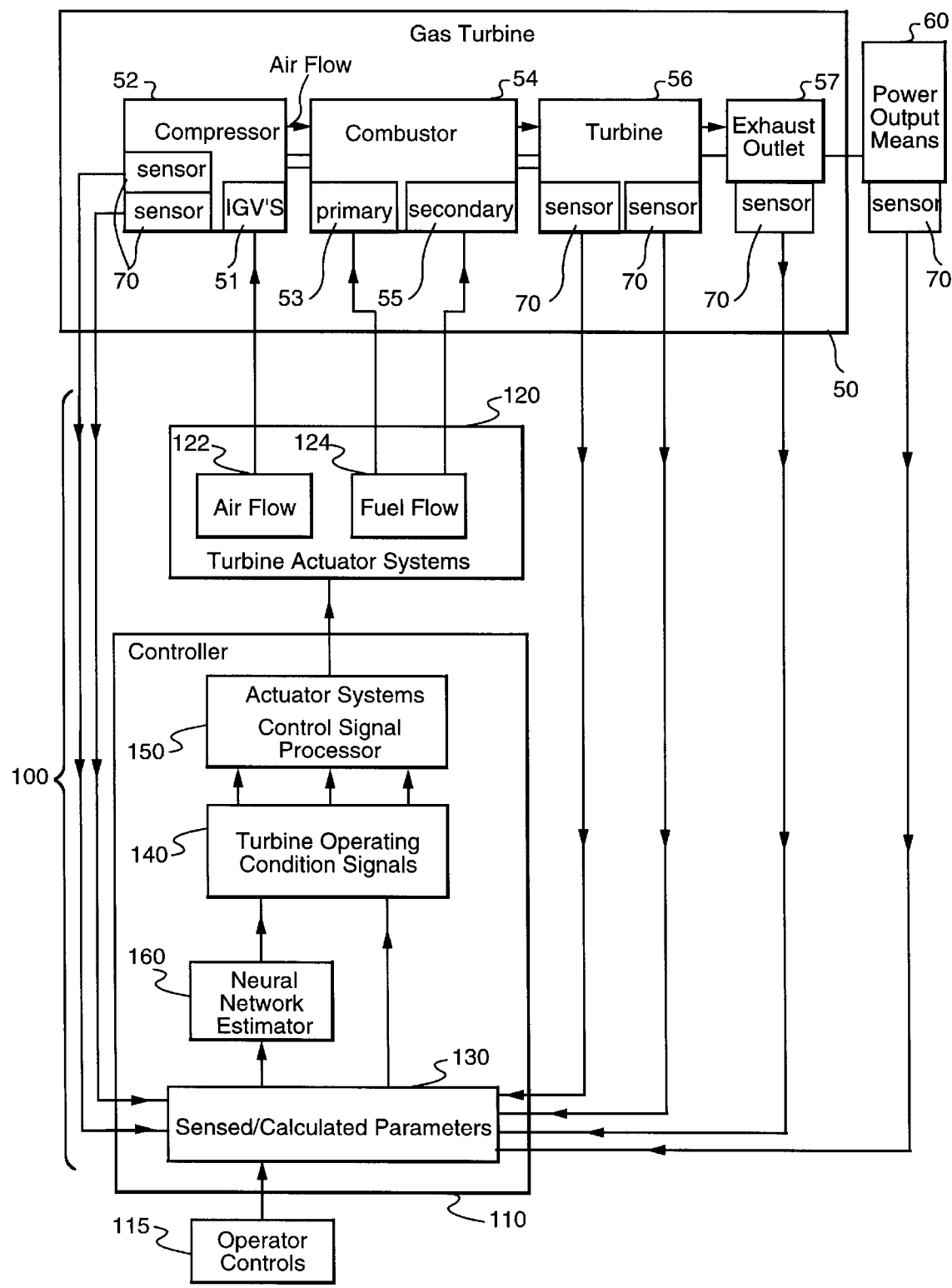
FIG. 1 is a block diagram of a gas turbine having a turbine control system in accordance with this invention.

A gas turbine control system 100 (FIG. 1) in accordance with this invention is coupled to a gas turbine 50 to govern the operation the turbine. Gas turbine 50 typically comprises a compressor 52, a combustor 54, a turbine section 56, and an exhaust outlet 57. Gas turbine 50 is further typically coupled to a power output means 60, such as an electric generator or the like, that is driven by turbine 50. Operation of turbine 50 may include, for example, startup of the turbine, loading of the turbine, maintaining a steady state loaded condition so as to provide stable power output while optimizing fuel use and emission generation, and shutdown of the turbine. For purposes of illustration and not limitation, examples of control of the gas turbine in the description of this invention relate primarily to steady state operation of a power-generation turbine that is operated to maintain a desired power output while optimizing fuel use and emission generation.

Control system 100 comprises a controller 110 that is coupled to receive input from a plurality of sources, such as operator controls 115 and a plurality of sensors 70 coupled to turbine 50 and power output means 60. Controller 110 typically comprises an electronic processor adapted to generate a plurality of control signals in response to the plurality of input signals processed. As used herein, "adapted to" and the like refers to a device that comprises the circuitry and programming to enable the processing of signals representing turbine operating parameters in accordance with selected functions that enable the generation of a desired command to control turbine operation. Generating signals "in response to" or "in correspondence with" typically refers to processing the signals in accordance with a predetermined function that represents the relation between one or more parameters, and is typically represented by mathematical equations.

One example of controller 110 is the General Electric Co. Mark V controller associated with power generation gas turbines; for turbine type aircraft engines, controller 110 typically is a full authority digital engine control device (FADEC), or the like. Controller 110 may comprise one or more electronic-type processing devices, such as microprocessor chips, application-specific integrated circuits, signal conditioning circuitry, or the like. Alternatively, optical signal processors can be used in some applications for control of systems in which data are transmitted by means of optical energy.

Controller 110 is coupled to a system of turbine actuators 120 that are used to maintain or establish a particular turbine operating regime. By way of example and not limitation, actuator systems 120 typically comprise an air flow control actuator 122 and a fuel flow actuator 124. Air flow actuator 122 comprises a device for controlling air flow into compressor 52, such as a positioning control for inlet guide vanes 51. Similarly, fuel flow actuator 124 comprises one or more devices for controlling fuel flow to the combustor, such as valves for throttling fuel flow into combustor 54; in some, but not all combustors, such fuel flow may be controlled by a primary zone fuel control valve 53 and also a secondary zone fuel control valve 55. For example, the primary fuel supply is mixed with inlet air prior to being burned in the combustion chamber and the secondary fuel supply is used to supply the flame in the combustion chamber. Such an arrangement is one means by which emissions from turbine 50 can be reduced; the effectiveness of the emissions reduction necessitates accurate control of the relative proportions of fuel being delivered by the primary and secondary manifolds. Alternatively, controller 110 can be coupled to additional actuating systems, such as bleed valves and cooling flow control valves that remove part of the air flowing from the discharge of the compressor for use in other control needs.

In accordance with this invention, controller 110 is coupled to receive signals from the plurality of sensors 70 that in turn are coupled to gas turbine 50 and load 60. Such sensors typically respectively comprise temperature sensors, pressure sensors, flow sensors, humidity sensors, speed sensors, flame detector sensors, valve positions sensors, guide vane angle sensors, or the like that sense various parameters pertinent to the operation of gas turbine 50. As used herein, "parameters" and similar terms refer to items that can be used to define the operating conditions of turbine 50, such as temperatures, pressures, and flows at defined locations in the turbine that can be used to represent a given turbine operating condition. Sensors 70 are typically coupled to controller 110 via a sensed parameters coupling device 130 such as a terminal board or the like.

Controller 110 further comprises processing means 140 for representing turbine operating conditions, such as with electrical signals that are representative of selected turbine operating parameters. Such turbine operation condition signals may be directly sensed, such as selected temperatures or pressures, or alternatively, may comprise calculated values (that is, determined from models embedded in controller 110 processor programming) for operating conditions parameters that are either difficult (or impossible) to directly measure (or sense). Commonly, turbine operating condition parameters that are calculated represent internal cycle parameters of the turbine, that is, values that are not directly measurable, but that can be represented (at least over a narrow range of sensed input values) by mathematical models representing sets of non-linear equations.

Turbine operating condition signals 140 are in turn coupled to an actuator system control signal processor 150 for generating control signals to turbine actuator systems 120 in correspondence with the turbine operating condition signals.

In accordance with this invention, controller 110 further comprises at least one neural network estimator 160 that is coupled in said controller to generate an estimated turbine operating condition signal (for purposes of illustration and not limitation, a single representative neural network estimator is illustrated in FIG. 1). Typically, neural network estimator 160 is coupled to receive selected sensed turbine operating parameters from sensors 70 and to generate an estimated turbine operation condition signal that is coupled to actuator system control signal processor 150. Alternatively, neural network estimator can be coupled to receive inputs from controller processors generating computed values of turbine operating parameters (e.g., from other neural networks or models programmed in processor of controller 110) in addition to sensed parameters.

Figure 2:
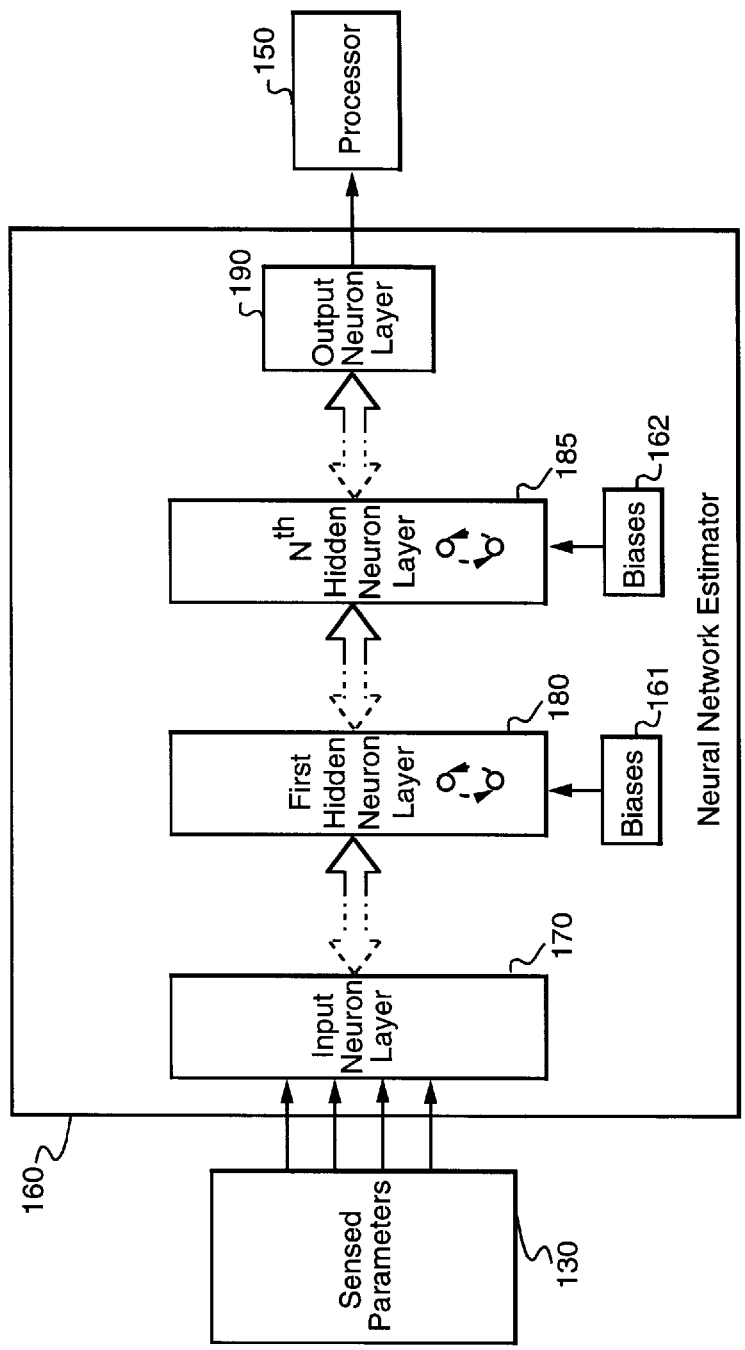
FIG. 2 a block diagram of one example of a neural network estimator in accordance with the present invention.

Neural network estimator 160 (FIG. 2) is a nonlinear estimator which can be trained to map a selected range of input signals so as to generate a desired output parameter that varies in correspondence with the input signals. Neural network estimator 160 typically comprises an input neuron layer 170 and at least a first hidden neuron layer 180. Multiple hidden neuron layers, e.g., through an $n^{th}$ hidden neuron layer 185, are coupled together, with the $n^{th}$ hidden neuron layer 185 being coupled to output neuron layer 190. Typically hidden neuron layers 180, 185 in estimator 160 are coupled together in a feedforward architecture, that is, signals processed through each respective neuron layer are passed to neurons in the next layer without backward or lateral connections. Alternatively, estimator 160 may comprise a recurrent neural network architecture with feedback connections between neuron layers, or lateral connections between neurons within a neuron layer. Additionally, bias means 161, 162 (such as power supplies providing a stable, determinable power source) are commonly coupled to each neuron layer of neural network estimator 160 to provide a means to adjust the squashing function, or the non-linear characteristic function for respective neurons in a layer. Signals passed from each layer to the next are processed by applying respective weights (associated with each respective neuron) to each signal passing from the neuron. The respective weights for each layer are determined in the training sequence as described below.

In accordance with one embodiment of this invention, neural network estimator 160 is employed in controller 110 to generate the estimated turbine internal cycle parameter of combustion reference temperature (TTRF), which will be described below for purposes of illustration and not limitation. TTRF is a turbine operating parameter that is not directly measurable, but rather must be calculated. The set of non-linear equations that estimate TTRF are complex and limitations of computational power and speed in most conventional gas turbine controllers result in modeling for determination of this parameter that provides an estimate within a desired range over a range of turbine operating parameters (e.g., over a range corresponding to turbine operation when an attached electrical generator is under load). For example, in a conventional gas turbine controller, the algorithm representing the model for TTRF commonly comprises numerous processing steps, such as about 55 multiplication and division steps and about 45 addition and subtraction steps, in addition to many conditional statements.

Figure 3:
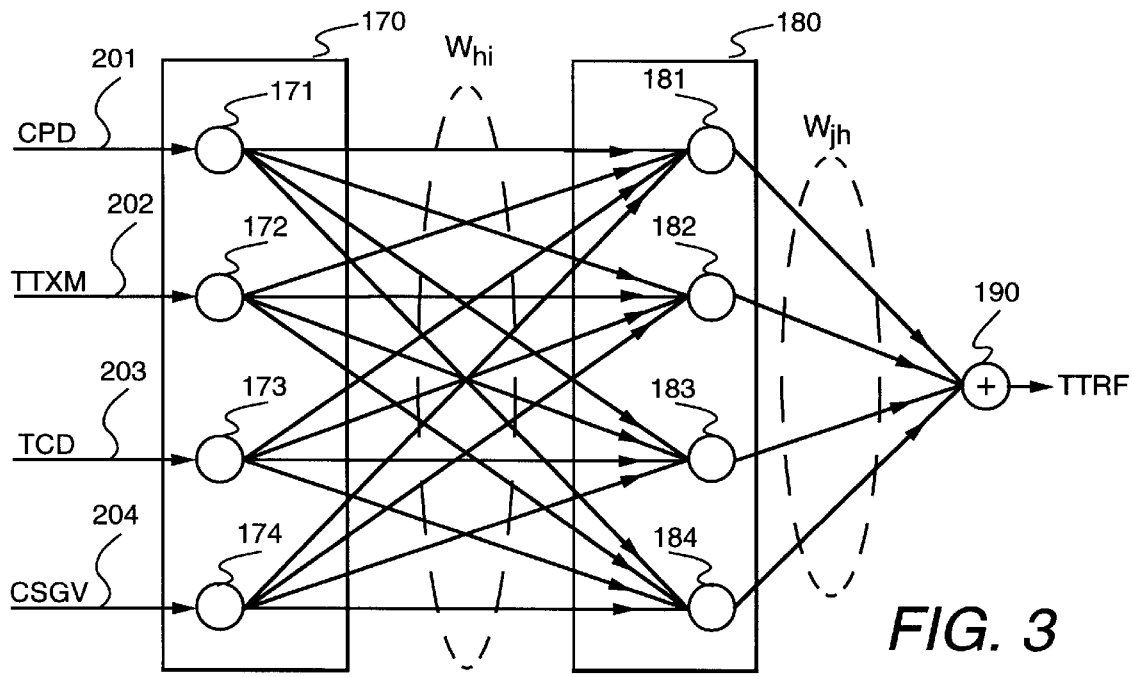
FIG. 3 is a further block diagram of one embodiment of a neural network estimator in accordance with the present invention.

In one embodiment of the present invention, neural network estimator 160 (FIG. 3) has four input neurons (or nodes) 171–174, respectively; four hidden (in single hidden neuron layer 180) neurons, 181–184 respectively, and one output neuron 190. Input neuron layer 170 is coupled to hidden neuron layer 180 and thence to output neuron layer 190 in a feedforward architecture. In the example illustrated, each respective layer is fully connected to the next sequential layer, that is each neuron in a layer is coupled to each neuron in the next sequential layer of the neural network. Neural network estimator 160 is coupled to receive turbine operating parameter signals from respective sensors 70 that represent the variables of which TTRF is a function. Examples of turbine operating parameters of which combustion reference temperature TTRF is a function include: a compressor discharge pressure signal 201 (CPD); an exhaust temperature signal 202 (TTXM); a compressor discharge temperature signal 203 (TCD); and an inlet guide vane angle signal (CSGV) (which signal corresponds to air flow through the turbine). Alternatively, other turbine air flow signals, such as turbine exhaust air flow, can be used as an operating parameter for determining TTRF; exhaust air flow is commonly provided by calculation (modeling) rather than direct measurement.

A hidden neuron "h" in this example is identified with the sigmoid function, and its output can be represented as follows:

$$O_h = \frac{1}{1 + e^{-\left(\sum_{i=1}^{n_i} W_{hi} \times I_i + b_h\right)}}$$

Wherein:
$O_h$ is the output of hidden neuron h;
$W_{hi}$ is the weight between input neuron i and hidden neuron h;
$I_i$ is the value of the $i^{th}$ input neuron; and
$b_h$ is the bias of hidden neuron h.
For purposes of illustration, a dotted line appears in FIG. 3 to represent weights applied between input layer neurons and hidden layer neurons, and between hidden layer neurons and output layer neurons. Typically each neuron to neuron connection has a respective weight associated with it (e.g., $W_{hi}$ as noted above, or $W_{jh}$ for the hidden ("h") to output ("j") neuron).

In this embodiment of the present invention, each respective input neuron 171–174 has a linear threshold function associated with it, and thus the output signal of the respective neuron (or node) is the same as its input. The characterizing function of the output neuron 190 is the weighted sum of its inputs (the weighting coming from the weighting applied to each respective input signal as it is passed to hidden neuron layer 180). A mathematical representation of the sum of output neuron 190 is represented as follows:

$$O_j = \sum_{h=1}^{n_h} W_{jh} \times O_h$$

Wherein:
j=1
$W_{jh}$ is the weight between hidden neuron h and output neuron j.

Prior to employment in an operating turbine, neural network estimator 160 is "trained" to provide an estimated turbine operation condition output signal (at neuron 190) in correspondence with a range of input signals. A learning algorithm is typically used in the training phase to generate the weights which represent the strengths of the connections between neurons, and the biases. The respective weight is applied to each signal passing to a neuron in the hidden layer. The topology (number of neuron layers and number of neurons in each layer 170, 180, etc.) defines the number of neural network weighting parameters to be tuned. Hence, in the embodiment illustrated in FIG. 3, there are 25 parameters to be tuned. This number of parameters is determined by the following relation:

$$parameters\ tuned = (n_h)*(n_i+n_o+1)+n_o$$

in which $n_h$ is the number of hidden neurons, $n_i$ is number of input neurons, and $n_o$ is the number of output neurons.

A backpropagation algorithm can be used for training neural network 160. Backpropagation is a steepest-descent optimization technique, in which at every iteration the new set of weights between neuron layers is an improvement over the prior set of weights as the training process moves towards the direction of the minimum of E, the error function. Other techniques, such as the Levenberg-Marquardt algorithm, can be advantageously used to update the parameters of the network. In the Levenberg-Marquardt algorithm, the weight update is a function of the Jacobian matrix (matrix of derivatives of E with respect to the weights) and an adjustable factor $\mu$, and the errors between the target values and the neural network estimates. This latter method requires greater computational resources but can provide faster convergence.

The training of neural network estimator 160 is begun with arbitrarily-assigned weight values used. First, a "forward pass" is undertaken, that is, a first input pattern is presented to the input neuron layer 170 and an output value is computed for output neuron 190. The respective layer weights are then updated according to training equations. The repetition of this process for all the patterns marks the completion of one epoch. Iterations continue until the desired accuracy between output signal at neuron 190 and the desired (e.g., predicted with high powered modeling computers) value for the output signal is achieved. At this point the network is considered to be trained, that is, ready to be used in an operating environment.

Figure 4:
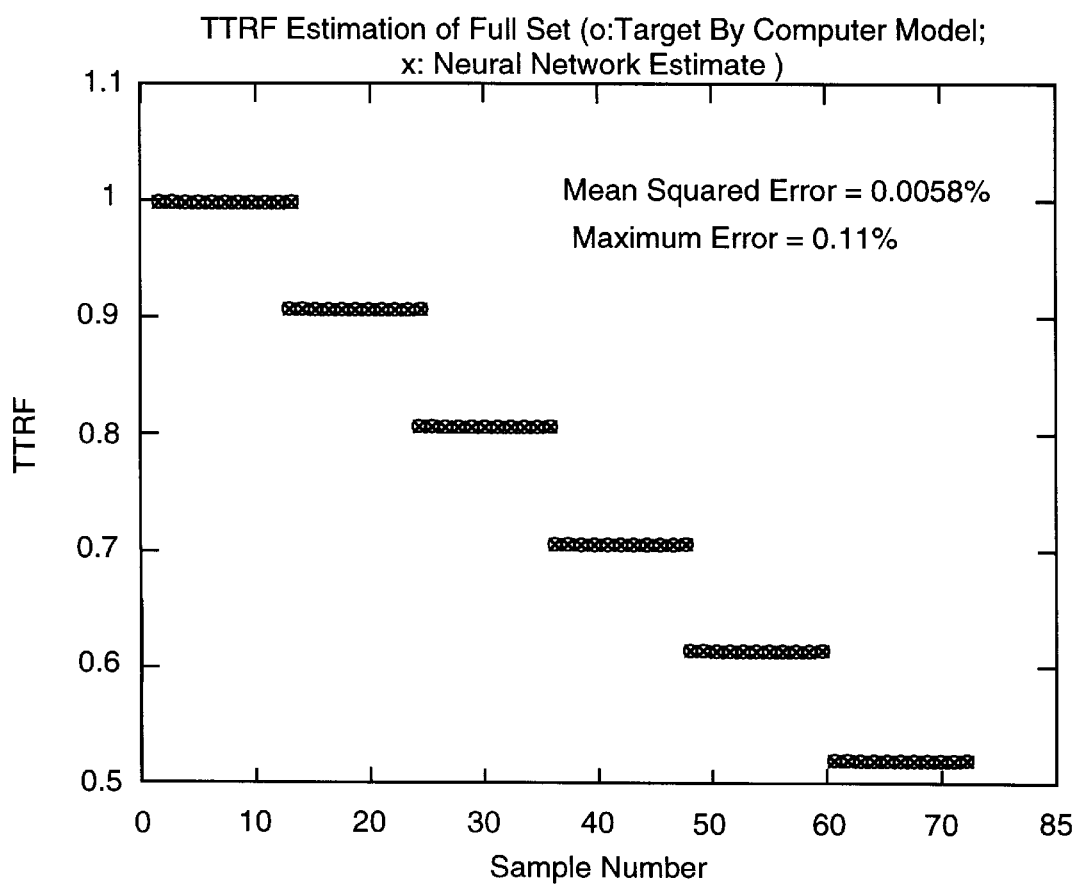
FIG. 4 is a graphic representation of a turbine operating condition parameter values determined by a controller having a neural network in accordance with this invention plotted against theoretical values predicted by solution of pertinent non-linear equations and values generated by the modeling of a conventional controller.

Tests of the present invention in an embodiment for determining TTRF in a gas turbine have been conducted. A neural network estimator 160 was trained with backpropagation to determine TTRF for a set of data points consisting of roughly one-third of predicted TTRF values that were obtained through the use of advanced modeling. Once trained, the neural network estimator 160 was presented with the full data set, and the predicted values were compared to the advanced modeling predictions obtained from a validated thermodynamic model of the turbine cycle. This model was run so that it converged to a selected TTRF, for a given operating point. Six different values of TTRF were chosen within the operating range of the turbine, and at each value, data for 12 operating points were calculated by varying various input parameters to the model. The comparison of these test cases is represented graphically in FIG. 4, in which values generated by neural network estimator 160 are represented with an "x", values generated by the advanced modeling computer by an "o". Seventy-two cases formed the total data set, and the training set was selected at random from these 72 cases. In terms of computational complexity, processing in neural network estimator 160 involves approximately 20 multiplication steps, 20 addition steps, and 4 look-up tables to approximate the threshold function. The conventional model uses about 55 multiplication steps and 45 addition steps, and a host of conditional (if-then) statements. Because there are no logical (nor conditional) blocks in the neural network implementation of the present invention, except in the look-up table, the computational speed of the neural network algorithm is faster than that of the conventional model.

The mean squared error (MSE) of a test set is determined by the square root of the sum of the squares of the errors between the target values as predicted by the computer model and the corresponding neural network estimated values, divided by the number of data points. For example, a test of one embodiment of the present invention provided data for turbine operating condition signals generated by neural network estimator 160, which, when compared with values obtained by the advanced computer model, provided an MSE of 0.0058%. This value represents an improvement over the corresponding MSE of the conventional controller of about 75%. The maximum error of the neural network estimator of the present invention in this test was about 0.11%, which is a substantial improvement (about 70%) over the modeling algorithm used in the conventional controller.

A more significant difference, however, between the two approaches arises when we consider the robustness of the model to variations in the model parameters. Fifty different perturbation runs were performed on the weights and biases. Each perturbation ranged randomly between 0% and 1%. Based on experience gained from working with neural network models for TTRF in the past, it is estimated that the MSE would increase by a factor of about 3, and the maximum error would increase by a factor of about 2. The neural network estimator in accordance with this invention delivers much improved accuracy as compared with the conventional controller, and is less sensitive to errors in the model parameters. From an engineering point of view, this provides a significant advantage, because implementing these algorithms on finite-word length digital controllers leads to truncation and round-off errors. In the case of the neural network estimator, the estimation accuracy is not affected as much as in the conventional controller model.

The neural network estimator in accordance with this invention is further readily implemented using the processors used for conventional real-time modeling in controllers 110.

Examples of other turbine operating parameters that can be advantageously determined with the use of neural network estimator in accordance with this invention include emissions generated in turbine operation, such as nitrogen oxides ($NO_x$), carbon monoxide (CO), and unburned hydrocarbons (UBH). In a controller for a turbine type engine for an aircraft, the estimated value of average flame temperature can be advantageously determined in accordance with this invention.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A gas turbine control system for generating control signals to govern operation of a gas turbine, said control system comprising:

a controller coupled to a plurality of turbine actuator systems, said actuator systems being coupled to said gas turbine so as to control the operation of said gas turbine in response to respective actuator system control signals generated by said controller;

said controller comprising a processor for generating said respective actuator system control signals in correspondence with a plurality of turbine operating condition signals, said controller further comprising at least one neural network estimator trained to generate at least one estimated turbine operating condition signal;

said estimated turbine operating condition signal representing a turbine internal cycle parameter that is not directly sensed in said turbine.

2. The control system of claim 1 wherein said controller is further coupled to a plurality of respective operating parameter sensors coupled to said gas turbine to provide respective turbine operation condition signals to said controller, said neural network estimator further being coupled to receive a plurality of neural net input signals, at least one of said neural net input signals originating from one of said operating parameter sensors.

3. The control system of claim 1 wherein said neural network estimator comprises a neural net programming structure selected from the group consisting of feedforward neural network architectures and recurrent neural network architectures.

4. The control system of claim 3 wherein said neural network estimator comprises a plurality of hidden neuron layers.

5. A gas turbine control system for generating control signals to govern operation of a gas turbine, said control system comprising:

a controller coupled to a plurality of respective operating parameter sensors, said operating parameter sensors being coupled to said gas turbine to provide respective turbine operating condition signals to said controller; and at least one neural network estimator, said estimator being coupled to receive a plurality of neural net input signals, at least one of said neural net input signals originating from one of said operating parameter sensors;

said controller further being coupled to a plurality of turbine actuator systems, said actuator systems being coupled to said gas turbine so as to control the operation of said gas turbine in response to respective actuator system control signals generated by said controller;

said controller comprising a processor for generating said respective actuator system control signals in correspondence with said turbine operating condition signals, said at least one neural network estimator being trained to generate at least one estimated turbine operating condition signal;

said estimated turbine operating condition signal generated by said neural network estimator representing a turbine internal cycle parameter for which said turbine has no corresponding operating parameter sensor.

6. The control system of claim 1 wherein said turbine operating condition signals comprise a plurality of respective turbine temperature, pressure, fuel flow, and air flow signals.

7. The control system of claim 1 wherein said estimated turbine operating condition signal generated by said neural network represents a value defined by a plurality of non-linear equations.

8. The control system of claim 8 wherein said neural network is trained to generate said estimated turbine operating condition signal over a selected range of turbine operating conditions, said selected range corresponding to turbine operations from startup to fully loaded.

9. A control system for generating control signals to govern operation of a gas turbine, said control system comprising:

a controller coupled to a plurality of turbine actuator systems, said actuator systems being coupled to said gas turbine so as to control the operation of said gas turbine in response to respective actuator system control signals generated by said controller; and a plurality of respective operating parameter sensors coupled to said gas turbine and to said controller so as to provide respective turbine operation condition signals to said controller, said parameter sensors comprising respective turbine pressure and temperature sensors;

said controller comprising a processor for generating said respective actuator system control signals in correspondence with the plurality of turbine operating condition signals, said turbine operating condition signals comprising respective turbine pressure, temperature, and fluid flow signals;

said processor comprising a neural network estimator trained to generate an estimated turbine combustion reference temperature signal in response to a plurality of neural net input signals, at least one of said neural net input signals originating from one of said operating parameter sensors.

10. The control system of claim 9 wherein said neural network estimator comprises a feedforward neural net having an input neuron layer, a hidden neuron layer, and an output neuron layer;

said input neuron layer and said hidden neuron layer each comprising a plurality of neurons, and said output neuron layer comprising a single neuron.

11. The control system of claim 10 wherein said neural network estimator comprises a single hidden neuron layer.

12. The control system of claim 10 wherein each layer of said neural network is fully connected.

13. A control system for generating control signals to govern operation of a gas turbine, said control system comprising:

a controller coupled to a plurality of turbine actuator systems, said actuator systems being coupled to said gas turbine so as to control the operation of said gas turbine in response to respective actuator system control signals generated by said controller; and a plurality of respective operating parameter sensors coupled to said gas turbine and to said controller so as to provide respective turbine operation condition signals to said controller said parameter sensors comprising respective turbine pressure and temperature sensors;

said controller comprising a processor for generating said respective actuator system control signals in correspondence with a plurality of turbine operating condition signals, said turbine operating condition signals comprising respective turbine pressure, temperature, and fluid flow signals;

said processor comprising a neural network estimator trained to generate an estimated turbine combustion reference temperature signal in response to a plurality of neural net input signals, at least one of said neural net input signals originating from one of said operating parameter sensors;

said neural network estimator comprising a feedforward neural network net having an input neuron layer, a hidden neuron layer, and an output neuron layer;

said input neuron layer and said hidden neuron layer each comprising a plurality of neurons, and said output neuron layer comprising a single neuron;

said neural net input signals comprising a compressor discharge pressure signal, a turbine exhaust temperature signal, a compressor discharge temperature signal, and a turbine air flow input signal.

14. The control system of claim 13 wherein said hidden neuron layer is adapted to process said neural net input signals in accordance with a sigmoid function, said function being expressed in the following form:

$$O_h = \frac{1}{1 + e^{-\left(\sum_{i=1}^{n_i} W_{hi} \times I_i + b_h\right)}}$$

Wherein:

$O_h$ is the output of hidden neuron h;

$W_{hi}$ is the weight between input neuron i and hidden neuron h;

$I_i$ is the value of the $i^{th}$ input neuron; and $b_h$ is the bias of hidden neuron h.

15. The control system of claim 9 wherein said actuator system control signals generated by said controller comprise fuel supply control signals and air supply control signals.

16. The control system of claim 15 wherein said fuel supply control signals comprise a primary fuel signal and a secondary fuel signal, the relative magnitude of fuel flow corresponding to said primary and secondary fuel signals varying in correspondence with said estimated turbine combustion reference temperature signal generated by said neural network estimator.

17. The control system of claim 1 wherein said neural network estimator is trained to generate the at least one estimated turbine operating condition signal based on at least two of the following turbine operating condition signals: a temperature signal, a pressure signal, a flow signal, a humidity signal, a speed signal, a flame detector signal, a valve position signal, and a guide vane angle signal.

18. The control system of claim 1, wherein said neural network estimator is trained to generate the at least one estimated turbine operating condition signal based on at least two of the following turbine operating condition signals: a compressor discharge pressure signal, an exhaust temperature signal, a compressor discharge temperature signal, an inlet guide vane angle signal, and a turbine exhaust air flow signal.

19. The control system of claim 1 wherein said neural network estimator is trained to generate an estimated turbine combustion reference temperature signal.

* * * * *